(12) United States Patent
Okumura

(10) Patent No.: US 6,396,386 B2
(45) Date of Patent: May 28, 2002

(54) ANGLE SENSOR WHICH MAKES IT POSSIBLE TO PREVENT RATTLING CAUSED BY BACKLASH BETWEEN GEARS INSIDE THE ANGLE SENSOR

(75) Inventor: Hirofumi Okumura, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/729,614

(22) Filed: Dec. 4, 2000

(30) Foreign Application Priority Data

Dec. 8, 1999 (JP) .......................... 11-348766
Dec. 8, 1999 (JP) .......................... 11-348792

(51) Int. Cl.[7] .................... H01C 10/40; H01C 10/42
(52) U.S. Cl. .................. 338/180; 338/128; 338/130
(58) Field of Search ........................ 338/181, 180, 338/DIG. 1, 128, 131, 129, 130, 132

(56) References Cited

U.S. PATENT DOCUMENTS

| | | | |
|---|---|---|---|
| 3,050,704 A | | 8/1962 | Dickinson et al. |
| 3,660,796 A | * | 5/1972 | Southwell .................. 338/180 |
| 3,742,421 A | | 6/1973 | Van Rooijen |
| 4,075,597 A | * | 2/1978 | Peart .......................... 338/128 |
| 4,313,349 A | * | 2/1982 | Heitman et al. ............. 74/507 |
| 4,712,101 A | * | 12/1987 | Culver ....................... 340/710 |
| 5,343,836 A | | 9/1994 | Fujiwara |
| 5,376,914 A | * | 12/1994 | Matsui et al. ............... 338/116 |
| 5,930,905 A | | 8/1999 | Zabler et al. |

FOREIGN PATENT DOCUMENTS

| | | |
|---|---|---|
| EP | 0 443 602 A2 | 2/1991 |
| JP | 62-27877 | 2/1987 |

* cited by examiner

*Primary Examiner*—Elvin Enad
*Assistant Examiner*—Kyung S. Lee
(74) *Attorney, Agent, or Firm*—Brinks Hofer Gilson & Lione

(57) ABSTRACT

An angle sensor in which, when a biasing member is used, a biasing force in the β2 direction acts on a driving gear, and a biasing force in the β1 direction acts on an auxiliary gear. This prevents backlash from occurring between a rotary member and the driving member, making it possible to reduce rattling between the rotary member and the driving member. A fitting member is provided at the free end side of a resilient supporting member in order to resiliently press a screw shaft in the Z1 direction. Therefore, internal threads of inside surfaces of corresponding fitting portions of the fitting member and thread grooves of the screw shaft can be made to uniformly closely contact each other, making it possible reduce rattling caused by backlash therebetween. Consequently, the angle of rotation of a steering wheel which is mounted to the rotary member is detected with high precision.

9 Claims, 6 Drawing Sheets

ANGLE SENSOR WHICH MAKES IT POSSIBLE TO PREVENT RATTLING CAUSED BY BACKLASH BETWEEN GEARS INSIDE THE ANGLE SENSOR

BACKGROUND OF THE INVENTION

1. Field of the Invention

The present invention relates to an angle sensor which detects, for example, the steering angle of a steering wheel of an automobile, and, more particularly, to an angle sensor which can detect the angle of rotation of the steering wheel with high precision as a result of preventing rattling caused by backlash between gears or between a gear and a screw shaft inside the angle sensor.

2. Description of the Related Art

FIG. 8 is a plan view showing the internal structure of a conventional angle sensor proposed in U.S. patent application Ser. No. 09-477971 by the inventor of the angle sensor in the application concerned. The conventional angle sensor is used to detect, for example, the steering angle of a steering wheel of an automobile with high precision.

In an angle sensor 1 shown in FIG. 8, a rotary member 3 is provided inside a case 2 formed of a synthetic resin material such as plastic. The rotary member 3 is a cylindrically shaped member formed of, for example, a synthetic resin material, and is rotatably supported with respect to the case 2. The steering wheel of an automobile is inserted into the rotary member 3, and the rotary member 3 rotates clockwise and counterclockwise along with the steering wheel. A plurality of helical gears 3a are formed along the entire outer peripheral surface of the rotary member 3.

A rotary shaft 9 is rotatably provided inside the case 2, with the illustrated X dimension being defined as the center axis thereof. A driving gear 8 is secured to the rotary shaft 9. A plurality of helical gears 8a are formed along the entire outer peripheral surface of the driving gear 8, and engage the helical gears 3a of the rotary member 3. The rotary shaft 9 is formed of a metallic material such as brass or aluminum, and has a spiral thread groove 9a formed from the center to one end thereof. A detecting member 4 is provided at the rotary shaft 9.

The detecting member 4 has a through hole formed therein from one end surface to the other end surface thereof in the direction of movement (that is, in the X dimension). Threads (not shown) which engage the thread groove 9a formed in the rotary shaft 9 are formed in the inner peripheral surface defining the through hole. A second magnet 5B is mounted to the bottom surface of the detecting member 4 by, for example, insert molding. The detecting member 4 is guided in the interior of the case 2 so as to move in a straight line in the X dimension. When the rotary member 3 rotates, the driving gear 8 and the rotary shaft 9 rotate, causing the detecting member 4 and the second magnet 5B to reciprocate in the X dimension.

A Hall element 6B is provided at a side opposing the second magnet 5B, on a fixing member 7 in the case 2. A magnetized first magnet 5A is integrally mounted to the outer circumferential surface of the rotary shaft 9. A second Hall element 6A is provided on the fixing member 7 so as to oppose the outer circumferential surface of the first magnet 5A.

When the rotary shaft 9 rotates with the rotation of the rotary member 3, the first magnet 5A rotates, causing a sine wave to be output. At the same time, the second magnet 5B reciprocates in the X dimension, causing values which change linearly through the entire rotational angle range of the steering wheel to be output. By detecting these values, the absolute position of the steering wheel resulting from the angle of rotation (that is, the steering angle) can be detected.

When an attempt is made to detect the angle of rotation (that is, the steering angle) of the steering wheel with high precision using the above-described angle sensor 1, the problem of rattling due to backlash between the helical gears 3a of the rotary member 3 and the helical gears 8a of the driving gear 8 arises.

More specifically, in the above-described angle sensor 1, the rotation of the rotary member 3 is detected, or the detecting member 4 is moved in the X dimension after changing the rotational movement to linear movement. Therefore, when the backlash between the helical gears 3a of the rotary member 3 and the helical gears 8a of the driving gear 8 is too large, the rattling therebetween causes an error to be produced in the distance of movement of the detecting member 4 which is moved in the X dimension. Here, when the direction of rotation of the rotary member 3 (or the steering wheel) changes, the driving of the driving gear 8 is reduced in correspondence with the amount of rattling caused by the backlash, causing hysteresis resulting from the direction of rotation to occur, whereby the amount of error is increased.

In the conventional angle sensor 1, backlash which occurs between the gears is decreased by increasing the degree with which the helical gears 3a of the rotary member 3 and the helical gears 8a of the driving gear 8 contact each other by biasing, for example, either the rotary member 3 in the Z2 direction towards the driving gear 8 or the driving gear 8 in the Z1 direction towards the rotary member 3.

However, when the degree with which the rotary member 3 and the driving gear 8 contact each other is increased to the extent that rattling does not occur, the biasing force produced between the gears becomes too large, so that rotational torque becomes large, and the rotary shaft 9 gets distorted due to, for example, thermal expansion, making it impossible to smoothly guide the detecting member 4 in the X dimension. In addition, the rotary shaft 9 has a simple beam structure in which both ends thereof are supported, so that, when a biasing force acts, the displacement of the portion corresponding to where the rotary member 3 and the driving gear 8 engage (that is, the center portion) is displaced the greatest, with the displacement becoming smaller towards both ends of the rotary shaft 9. Therefore, the rate of change of the strength of the magnetic field in the Z dimension with respect to the distance of movement of the second magnet 5B and the detecting member 4 is no longer linear with respect to the direction of movement. In addition, the distance between the first magnet 5A and the first Hall element 6A changes so that a predetermined output can no longer be obtained. Therefore, the distance of movement of the detecting member 4 can no longer be detected precisely, so that the precision with which the angle of rotation (that is, the steering angle) of the rotary member 3 (or the steering wheel) is detected is decreased.

In the above-described conventional angle sensor 1, the detecting member 4 and the screw shaft 9a are constructed so that only the screw shaft 9a engages the threads formed in the through hole 4a of the detecting hole 4. Therefore, play (that is, backlash) tends to occur between the threads of the detecting member 4 and the thread grooves of the thread groove 9a. The backlash tends to result in rattling of the detecting member 4 in the axial direction (that is, the X dimension), so that a precise distance of movement in accordance with the angle of rotation of the rotary member 3 cannot be obtained by the detecting member 4. Therefore, the Hall element 6B can no longer be used to detect with high precision the angle of rotation of a shaft to be detected, such as a steering wheel.

SUMMARY OF THE INVENTION

To overcome the aforementioned conventional problems, it is an object of the present invention to provide an angle sensor which can detect the angle of rotation of a rotary member with high precision as a result of decreasing backlash between a driving gear and a gear of the rotary member.

It is also another object of the present invention to provide an angle sensor in which a detecting member which reciprocates in accordance with the rotation of a screw shaft is advanced with high precision.

To these ends, according to a first aspect of the present invention, there is provided an angle sensor for detecting an angle of rotation of a first rotary shaft by a detecting operation of a detecting portion. The angle sensor comprises a first gear which rotates in accordance with the first rotary shaft, a second rotary shaft which extends in a direction perpendicular to the first rotary shaft, a second gear which rotates along with the second rotary shaft and which engages the first gear, a third gear which is rotatably provided at the second rotary shaft and which engages the first gear, and the detecting portion which detects the rotation of the second rotary shaft. In the angle sensor, the first gear engages the second gear and the third gear in a screw gear relationship, and a biasing member is provided at the second rotary shaft. The biasing member causes a tooth of the first gear to be sandwiched between a tooth of the second gear and a tooth of the third gear.

In one form of the first aspect of the invention, the biasing member may exert a biasing force onto the second gear in a direction of rotation thereof.

It another form of the first aspect of the invention, the biasing member may exert a biasing force in a direction in which the second gear approaches the first gear.

In the invention, the second gear (that is, a driving gear) and the third gear (that is, an auxiliary gear) are disposed at the first gear (that is, a rotary member) through the biasing member, so that a tooth of the second gear as well as a tooth of the third gear resiliently presses against a tooth of the first gear. Here, the second rotary shaft rotates similarly to the second gear.

Accordingly, it is possible for the second gear to always drive the second rotary shaft while the second gear resiliently presses against the first gear at all times. This makes it possible to eliminate rattling caused by backlash between the first and second gears. Consequently, the rotational force which is applied to the rotary member from the steering wheel can be transmitted to the driving gear with high efficiency, thereby allowing the angle of rotation of the steering wheel to be detected with high precision.

In still another form of the first aspect of the invention, the first gear and the second gear may engage each other at an intersection point where an imaginary normal line from the center of rotation of the first gear vertically intersects the second rotary shaft, and the third gear may be provided at a location situated away from the intersection point.

By virtue of this structure, the rotational force of the first gear can be transmitted to the second gear with precision and with high efficiency.

When the first gear and the second gear engage each other at an intersection point where an imaginary normal line from the center of rotation of the first gear vertically intersects the second rotary shaft, and when the third gear is provided at a location situated away from the intersection point, the third gear may be a helical gear having an inverted spherical surface.

By virtue of this structure, the first and second gears can be disposed in a row with the second rotary shaft, so that they can be disposed in a smaller area.

According to a second aspect of the present invention, there is provided an angle sensor for detecting an angle of rotation of a first rotary shaft as a result of a detecting operation by a detecting member. The angle sensor comprises a first gear which rotates in accordance with the first rotary shaft, a screw shaft which extends in a direction perpendicular to the first rotary shaft, a second gear which rotates with the screw shaft and which engages the first gear, a fitting member which engages the screw shaft and which moves in an axial direction of the screw shaft by a rotational force of the screw shaft, a detection member to be detected which moves along with the fitting member, a detection portion to be detected provided at the detection member, and a detecting member for detecting a linear movement of the detection portion. In the angle sensor, the fitting member and the detection member are connected together by a plate spring, and the fitting member is supported by the plate spring. In addition, a plate thickness direction of the plate spring is oriented in a direction perpendicular to a direction of movement of the fitting member and the detection member. Further, the plate spring is secured to the fitting member and the detection member in the direction perpendicular to the direction of movement of the fitting member and the detection member and at a location where a gap is formed in a plate surface direction. The plate spring is secured along a line facing the direction of movement of the fitting member and the detection member.

In the invention, the plate thickness direction (that is, a surface direction) of the plate spring faces the resiliency dimension (that is, the Z dimension) of the plate spring, and the fitting member and the detection member are secured along a line which extends in the resiliency dimension of the plate spring. This prevents the plate spring from becoming twisted, thereby allowing the fitting member to be stably fitted to the screw shaft, so that the detection member can be reliably moved.

In one form of the second aspect of the invention, a mounting surface of the plate spring for mounting to the fitting member and a mounting surface of the plate spring for mounting to the detection member may be located in the same plane.

By virtue of this structure, the angle sensor can be made thinner.

In another form of the second aspect of the invention, the fitting member may comprise a U-shaped fitting portion which opens in a direction perpendicular to a plane of the plate spring, the fitting portion engaging the screw shaft.

In the above-described structure, an opening can be formed in a portion of the fitting portion by forming the fitting portion into a U shape in cross section. Therefore, it is possible to easily perform mounting and dismounting operations of the screw shaft and the fitting portion through this opening.

When the fitting member comprises a U-shaped fitting portion which opens in a direction perpendicular to a plane of the plate spring, and the fitting portion engages the screw shaft, the fitting member may comprise a pair of the fitting portions which are separated from each other in the direction of movement thereof. In addition, the plate spring may have a cutaway portion formed in the center portion thereof, and the pair of fitting portions may be biased towards the screw shaft by an area of the plate spring where the cutaway portion is not formed.

By virtue of this structure, the pair of fitting portions can be independently pushed against the screw shaft, so that they can stably press against the screw shaft without tilting.

In still another form of the second aspect of the invention, the angle sensor may further comprise a guiding member for guiding the movement of the detection member in an axial direction thereof. The guiding member has at least one rail which is provided parallel to the screw shaft. The detection member slides on the at least one rail.

In other words, one rail or two or more rails may be used. When a rail or rails which are parallel to the screw shaft are provided, the detection member can move smoothly in a straight line with respect to a detecting means. (that is, a Hall element).

Two of the rails parallel to each other may be provided along the direction of movement, and the fitting member may be located substantially at the center of a region between the two rails.

By virtue of this structure, the load of the holder which holds the detecting member can be distributed uniformly on the two rails, so that it is possible to prevent problems such as tilting of the holder and derailment of a slider of the holder from the rails from occurring. Therefore, it is possible to always move the detection member parallel to the detecting member, thereby allowing very small angles of the first rotary shaft which is a detect shaft (that is, a steering wheel) to be stably detected.

DESCRIPTION OF THE PREFERRED EMBODIMENTS

Hereunder, a description of the present invention will be given with reference to the drawings.

Figure 1:
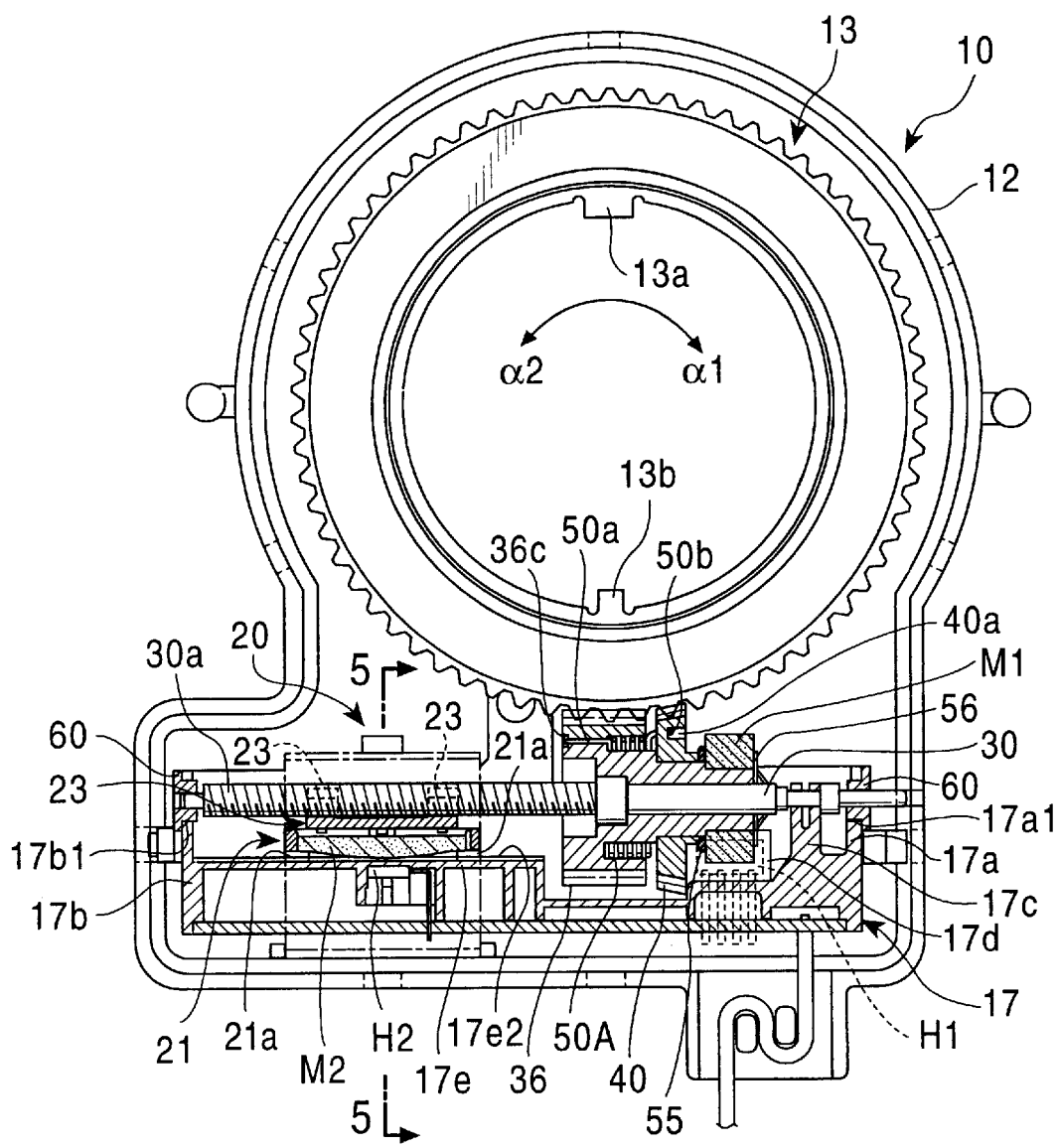
FIG. 1 is a front sectional view of the internal structure of an angle sensor in accordance with the present invention.
Figure 1:
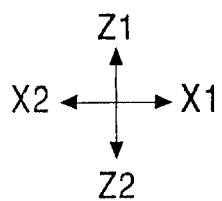
Figure 2:
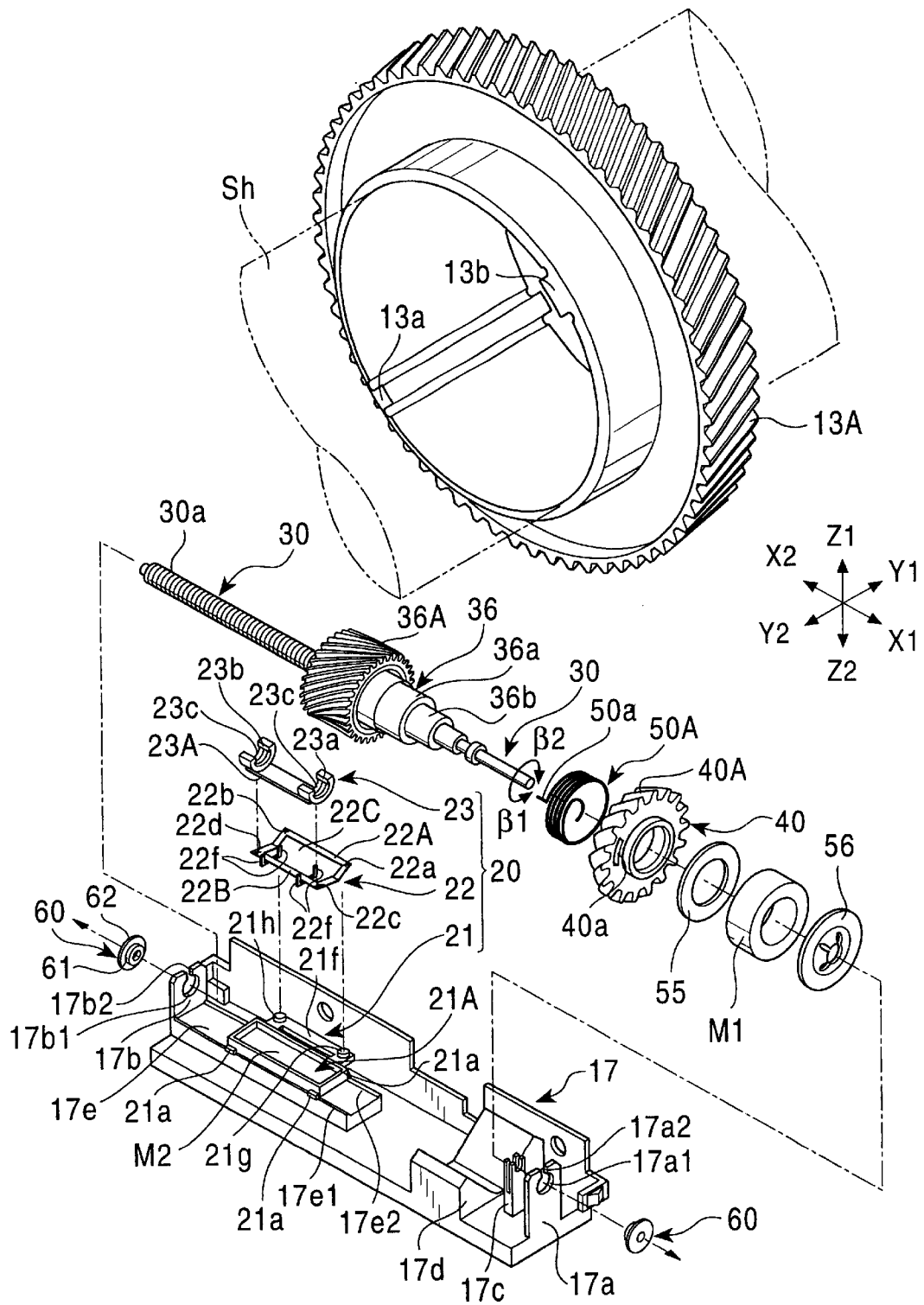
FIG. 2 is an exploded perspective view of the main portion of the angle sensor.
Figure 3:
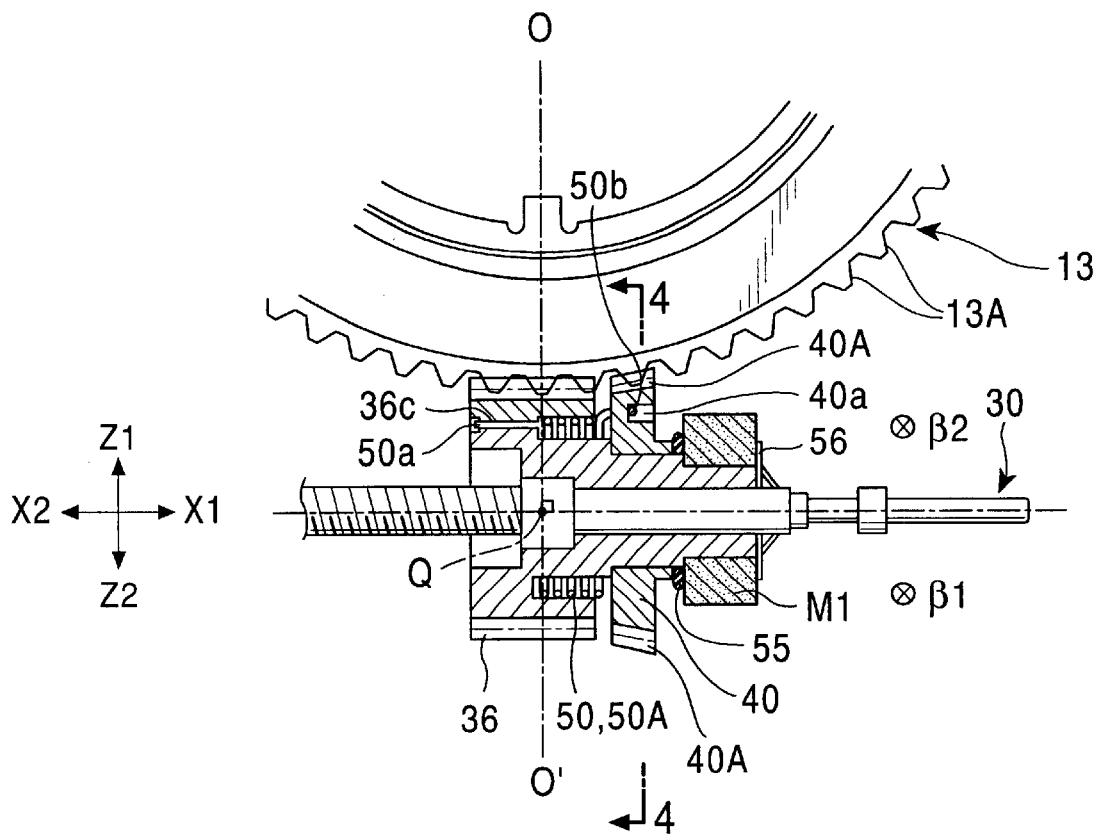
FIG. 3 is an enlarged sectional view of the main portion of the angle sensor.
Figure 4:
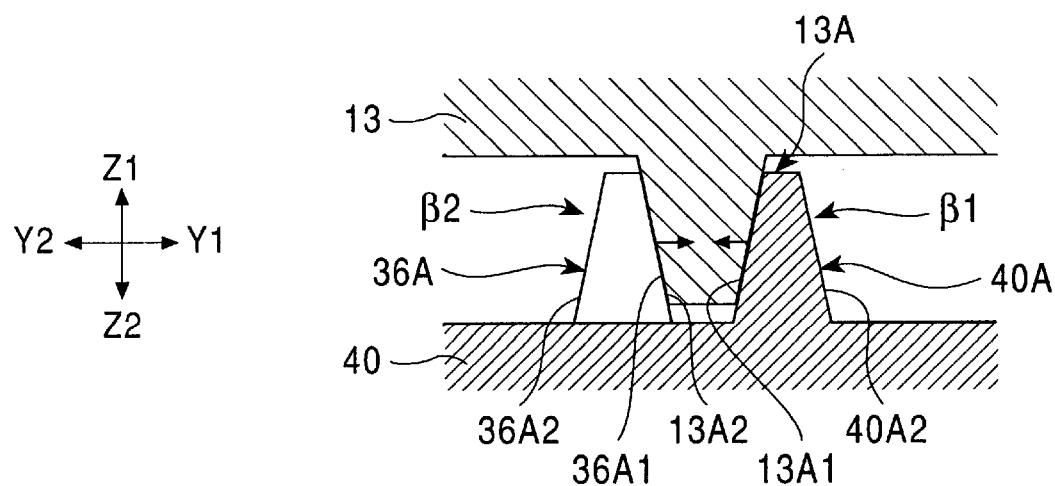
FIG. 4 is a schematic sectional view taken along line 4—4 in FIG. 3.
Figure 5:
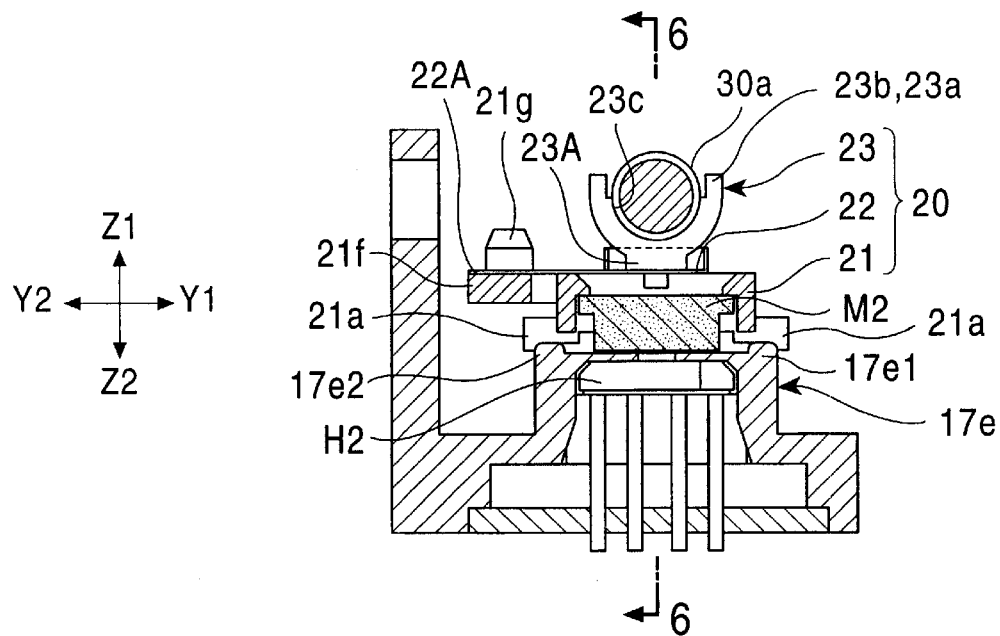
FIG. 5 is a sectional view taken along line 5—5 in FIG. 1.
Figure 6:
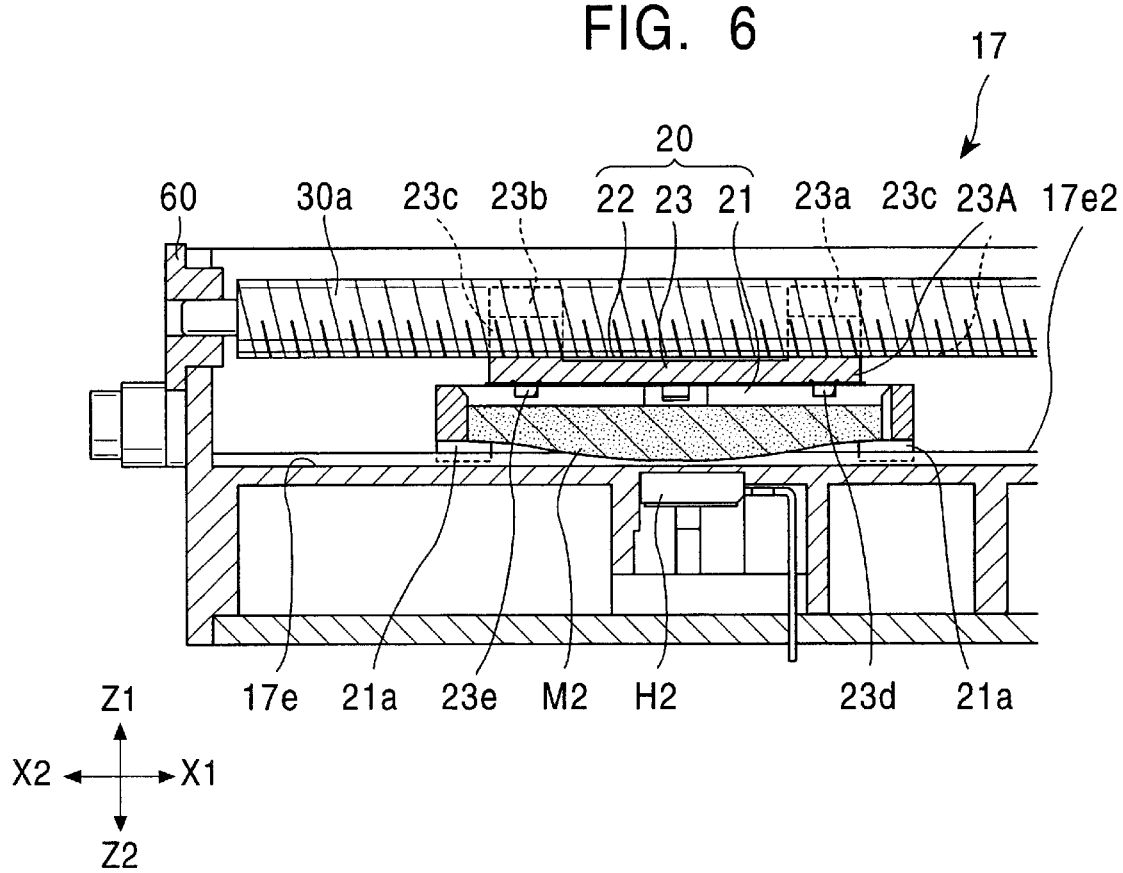
FIG. 6 is an enlarged sectional view taken along line 6—6 in FIG. 5.

FIG. 1 is a front sectional view of the internal structure of a first embodiment of an angle sensor in accordance with the present invention. The angle sensor is used to detect, for example, the steering angle of a steering wheel of an automobile with high precision. FIG. 2 is an exploded perspective view of the main portion of the angle sensor. FIG. 3 is an enlarged sectional view of the main portion of the angle sensor. FIG. 4 is a schematic sectional view taken along line 4—4 in FIG. 3. FIG. 5 is a sectional view taken along line 5—5 in FIG. 1. FIG. 6 is an enlarged sectional view taken along line 6—6 in FIG. 5.

In an angle sensor 10 shown in FIG. 1, reference numeral 12 denotes a case, and reference numeral 13 denotes a rotary member (or a first gear). The rotary member 13 is a cylindrically shaped member formed of a synthetic resin material, and is supported inside the case 12 so as to be rotatable in the illustrated clockwise direction (that is, in the α1 direction) and the illustrated counterclockwise direction (that is, in the α2 direction). A hollow is formed in the center of the rotary member 13. A steering wheel Sh (that is, a first rotary shaft) of an automobile is inserted into this hollow (see FIG. 2). Axially extending protrusions 13a and 13b are formed on the inner peripheral surface of the rotary member 13, and can be fitted into recesses (not shown) formed in the outer peripheral surface of the steering wheel Sh. When the steering wheel Sh is rotated, the rotary member 13 is also rotated. In addition, as shown in FIG. 2, a helical gear 13A having teeth obliquely cut at an angle of approximately 45° from an axial dimension (that is, the Y dimension) is formed along the outer peripheral surface of the rotary member 13.

A unit case 17 is provided at the lower portion of the case 12 (in the Z2 direction in FIG. 1). The unit case 17 is formed of synthetic resin subjected to, for example, injection molding, and is mounted at the bottom portion of the case 12, as shown in FIG. 1. Supports 17a and 17b which extend in the illustrated Z1 direction are formed at both ends of the unit case 17 in the X1 and X2 directions, with circular supporting portions 17a1 and 17b1 being formed in ends of the corresponding supports 17a and 17b. Cutaway portions 17a2 and 17b2 which are openings in the edges of the corresponding supporting portions 17a1 and 17b1 are formed in the top portions of the supporting portions 17a1 and 17b1. Both ends of a rotary shaft 30 (described later) can be mounted in the supporting portions 17a1 and 17b1 through the cutaway portions 17a2 and 17b2. A support 17c, first base 17d, and a second base 17e are provided between the supports 17a and 17b.

In the embodiment, the auxiliary support 17c is disposed beside the illustrated right support 17a. However, the auxiliary support 17c may be disposed beside, for example, the illustrated left support 17b, or between the first base 17d and the second base 17e.

As shown in FIGS. 1 and 2, the first base 17d is formed into a substantially V shape. A pair of Hall elements Hi (that is, detecting members) are provided at the back sides of inclined surfaces of the V-shaped portion (that is, in the interior of the first base 17d) while their external forms are positioned. The second base 17e is a rectangular parallelepiped which extends in the illustrated X dimension. Rails 17e1 and 17e2 which have protruding shapes in cross section are formed on both sides of the top surface of the second base 17e so as to extend in the X dimension. As shown in FIGS. 1, 5 and 6, a Hall element H2 (that is, a detecting member) is provided in the interior of the second base 17e while its external form is positioned. A detection member 20 to be detected which is slidable in the X dimension opposes the top portion of the second base 17e. An MR element, a magnetic flux detecting coil, or the like may be used in place of the Hall elements H1 and the Hall element H2.

The detection member 20 comprises a holder 21, a plate spring 22, and a fitting member 23. The holder 21 is formed of synthetic resin, and has a planar rectangular space 21A formed therein. Four sliders 21a which protrude in the illustrated Y dimension are provided at the four corners of the holder 21 which enclose the space 21A. The bottom surface of each slider 21a is a smooth surface having a small coefficient of friction, with the widthwise distances between the bottom surfaces of the sliders 21a (that is, the distances between opposing bottom surfaces of the sliders 21a in the Y dimension) being the same as the widthwise distance between the rails 17e1 and 17e2. While the sliders 21a of the holder 21 are placed on the rails 17e1 and 17e2, the holder 21 can reciprocate in the illustrated X dimension.

A second magnet M2 (that is, a detection member to be detected) formed of a magnetic material such as ferrite which is magnetized so as to have a pair of N and S poles along the axial direction is held in the space 21A in the holder 21, with the magnetized surface of the second magnet M2 and the Hall element H2 opposing each other. A securing portion 21f is provided at the illustrated Y side of the holder 21. Protrusions 21g and 21h which protrude in the illustrated Z1 direction are formed on the securing portion 21f.

The plate spring 22 and the fitting member 23 are provided at the top portion of the space 21A. The plate spring 22 is formed by pressing and/or punching, or bending one piece of thin metallic plate or resin plate. The illustrated Y1 side (that is, the fixed-end-side) surface of the plate spring 22 is a mounting surface 22A, whereas the illustrated Y2 side (that is, the free-end-side) surface is a mounting surface 22B. The mounting surfaces 22A and 22B are joined together through a bent portion. A square cutaway portion 22C is formed in the center portion of the plate spring 22. Cross-shaped cuts 22a and 22b are formed in the mounting surface 22A of the plate spring 22 along the direction of movement of the detection member 20 (that is, in the X dimension). When the protrusions 21g and 21h of the holder 21 are inserted into and firmly fitted in the corresponding cuts 22a and 22b, the Y1-side mounting surface 22A of the plate spring 22 is secured to the securing portion 21f of the holder 21. Accordingly, the plate spring 22 is supported by the securing portion 21f in a cantilever arrangement. The (Y2-side) mounting surface 22B is the free end, and the plate thickness direction of the plate spring 22 (that is, the direction of the normal line in a plane=the illustrated Z dimension) is the resiliency direction. Positioning holes 22c and 22d are formed in both ends of the free-end-side mounting surface 22B along the direction of movement of the detection member 20 (that is, in the X dimension). Supporting arms 22f and 22f whose ends are bent in the Z1 direction and which extend in the illustrated Y1 direction in the cutaway portion 22C, and supporting arms 22f and 22f whose ends are also bent in the Z1 direction and which extend in the Y2 direction in the cutaway portion 22C are integrally formed between the holes 22c and 22d.

As shown in FIG. 2, the fitting member 23 is secured onto the mounting surface 22B of the plate spring 22 so that the longitudinal direction of the fitting member 23 is parallel to the direction of movement of the detection member 20 (that is, to the X dimension). The fitting member 23 is formed of a resin material, and a through hole is formed in both ends of a base 23A in the X1 and X2 directions, from one end surface to the other end surface of a column. A pair of hollow, semi-columnar fitting portions 23a and 23b are also formed in both sides of the fitting member 23 by cutting the column in a plane parallel to the XY plane. In other words, the fitting portions 23a and 23b are formed into U shapes in cross section. Internal threads are formed in inside surfaces 23c and 23c of the corresponding fitting portions 23a and 23b.

Small-diameter protrusions 23d and 23e having shapes similar to those of the protrusions 21g and 21h of the holder 21 are formed on the back surface (that is, the Z2-side surface) of the base 23A of the fitting member 23 so as to protrude in the illustrated Z2 direction (see FIG. 6). By inserting the protrusions 23d and 23e into the corresponding holes 22c and 22d formed in the mounting surface 22B of the plate spring 22, and positioning them, and caulking the supporting arms 22f, 22f, 22f, and 22f onto the base 23A of the fitting member 23, the fitting member 23 is firmly held by the mounting surface 22B, whereby the fitting member 23 is held by the free end of the plate spring 22.

Accordingly, when the fitting member 23 is secured to the mounting surface 22B of the plate spring 22, the fitting member 23 is placed directly above the space 21A of the holder 21. By the resilient force of the plate spring 22, the fitting member 23 is resiliently supported in the illustrated Z1 direction so as to resiliently press against a screw shaft 30a (described later).

In the same plane as the plate spring 22 formed of one plate, and at both ends (that is, the Y-side fixed end and the Y2-side free end) of the plate spring 22 separated by a gap in a direction (that is, the Y dimension or a plate surface direction) perpendicular to the direction of movement of the detection member 20 (that is, the X dimension), the holder 21 and the fitting member 23 are secured along the direction of movement of the detection member 20 (that is, along the X dimension). In other words, the holder 21 and the fitting member 23 are secured such that the longitudinal directions thereof are parallel to the direction of movement of the detection member 20. Therefore, it is possible to make them thinner and to prevent twisting which tends to occur at the free end side of the plate spring 22. In addition, since the plate spring 22 can be held by the fitting member 23, and these can be easily mounted to the holder 21, the assembly operation can be easily carried out.

A driving gear 36 (that is, a second gear) is secured to the rotary shaft 30 (that is, a second rotary shaft) so as to be rotatable with the rotary shaft 30. A helical gear 36A having the same module as the helical gear 13A formed along the outer peripheral surface of the rotary member 13 is formed along the outer peripheral surface of the driving gear 36. The screw shaft 30a which has a helical shape is formed from the portion of the rotary shaft 30 adjacent to the driving gear 36 to the left end of the rotary shaft 30. The pitch between thread grooves of the screw shaft 30a is the same as the pitch of the internal threads formed in the inside surfaces 23c and 23c of the corresponding fitting portions 23a and 23b.

When both ends of the rotary shaft 30 are supported between the supporting portion 17a1 of the support 17a and the supporting portion 17b1 of the support 17b, the screw shaft 30a is set so as to be positioned directly above the fitting member 23 provided at the free end of the plate spring 22. Therefore, the fitting portions 23a and 23b of the fitting member 23 provided at the free end of the plate spring 22 can engage the screw shaft 30a from the illustrated Z1 direction.

Here, since the plate spring 22 is twisted less frequently as mentioned above, the fitting member 23 can be biased horizontally in the Z1 direction. Therefore, it is possible to prevent the production of tilted biasing force with respect to the screw shaft 30a, at both ends of the fitting portions 23a and 23b. Therefore, the screw shaft 30a can be resiliently pressed against the fitting portions 23a and 23b with a uniform biasing force. Consequently, the screw shaft 30a and the inside surfaces 23c and 23c of the corresponding fitting portions 23a and 23b can uniformly closely contact each other, making it possible to reduce rattling therebetween.

The biasing force of the plate spring 22 pushes the fitting member 23 onto the screw shaft 30a, and the holder 21 towards the second base 17e (that is, in the illustrated Z2 direction). Here, when the fitting member 23 is set so as to be positioned at about the center of the region between the two rails 17e1 and 17e2, the load of the holder 21 which holds the second magnet M2 is substantially uniformly distributed onto the two rails 17e1 and 17e2 through each of the sliders 21a. This makes it possible to prevent the occurrence of problems such as tilting of the holder 21 and derailment of the sliders 21a from the rails 17e1 and 17e2. Therefore, it is possible to always move the detection member 20 and the second magnet M2 parallel to the Hall element H2, making it possible to stably detect very small angles of rotation of the first rotary shaft (that is, the steering wheel) which is a detect shaft to be detected.

A fat axially extending portion 36a and a thin axially extending portion 36b which extend along the axial center portion of the driving gear 36 in the X1 direction are formed at the illustrated right end side of the driving gear 36. The thin axially extending portion 36b is formed continuously with the fat axially extending portion 36a in the illustrated X1 direction. An auxiliary gear (that is, a third gear) 40 is rotatably inserted onto the fat axially extending portion 36a. A biasing member 50A is provided between the right end surface of the driving gear 36 and the auxiliary gear 40. The biasing member 50A used in the embodiment shown in FIGS. 1 and 2 is, for example, a torsion spring 50. One end 50a of the biasing member 50A is formed so as to extend in the illustrated X2 direction, and is inserted into an insertion hole 36c formed in the driving gear 36 as shown in FIG. 3. The other end 50b of the biasing member 50A is caught by a catching portion 40a formed in an opposing surface of the auxiliary gear 40. It is mounted in a twisted state so as to have a small inside diameter. In addition, it is subjected to a force sufficient to cause rotation of the rotary shaft 30. Further, it is mounted in a flexed state in the axial direction.

A helical gear 40A is formed along the outer peripheral surface of the auxiliary gear 40. More specifically, the outside diameter of the side of the auxiliary gear 40 opposing the driving gear 36 is smaller than the outside diameter of the opposite side of the auxiliary gear 40. The portion between these sides of the gear 40A is a helical gear-shaped portion having an inverted spherical surface having a diametrical curvature equal to that of the helical gear 13A formed at the outer peripheral surface of the rotary member 13. In other words, as shown in FIG. 1, the teeth of the auxiliary gear 40 in axial cross section are helical along a circumferential direction of the rotary member 13. Therefore, the auxiliary gear 40 is formed so that it reliably engages the gear of the rotary member 13 at a location situated away from an imaginary normal line O–O' in the illustrated X1 direction (see FIG. 3). The auxiliary gear 40 may be a bevel gear in which the teeth thereof in axial cross section are linearly tilted along the circumferential direction of the rotary member 13.

An annular washer 55 and a first magnet M1 are provided at the illustrated right end side of the auxiliary gear 40. The inside diameter of the first magnet M1 is substantially equal to the outside diameter of the thin axially extending portion 36b of the driving gear 36. The first magnet M1 can be secured to the rotary shaft 30 by fitting the first magnet M1 onto the thin axially extending portion 36b.

Both surfaces of the washer 55 are smooth surfaces having a small coefficient of friction. Sliding friction between an end surface of the auxiliary gear 40 and an end surface of the first magnet M1 can be reduced by interposing the washer 55 between the auxiliary gear 40 and the first magnet M1. In order to prevent the auxiliary gear 40 and the first magnet M1 from becoming dislodged, it is preferable that a speed nut 56 be provided so as to contact the end surface of the first magnet M1 and the end surface of the driving gear 36.

The rotary shaft 30 having the driving gear 36, the auxiliary gear 40, the biasing member 50A, the washer 55, and the magnet M1 formed thereat is supported between the supporting portion 17a1 of the support 17a and the supporting portion 17b1 of the support 17b. Here, bearings 60 and 60 are mounted to both ends of the rotary shaft 30, respectively. The bearings 60 and 60 are molded out of synthetic resin material. Each bearing 60 comprises a cylindrical bearing portion 61 and a flange 62 formed on one surface of the corresponding bearing portion 61. While both ends of the rotary shaft 30 are inserted in the bearings 60 and 60, the outer peripheral surfaces of the bearing portions 61 and 61 are supported by the supporting portion 17a1 of the support 17a and the supporting portion 17b1 of the support 17b, respectively.

This prevents shifting of the rotary shaft 30 in the radial direction (that is, the direction perpendicular to the rotary shaft 30).

As shown in FIGS. 1, when the rotary shaft 30 is secured inside the unit case 17, the magnet M1 is set opposing the inclined surfaces of the substantially V-shaped portion of the first base 17d. The fitting portions 23a and 23b of the fitting member 23 engage the screw shaft 30a. The driving gear 36 is disposed between the first base 17d and the sliding second base 17e.

As described above, the unit case 17 having the rotary shaft 30 and the like mounted thereat is secured at the bottom portion of the inside of the case 12. When the rotary member 13 is provided in the case 12, the helical gear 13A of the rotary member 13 and the helical gear 36A of the driving gear 36 engage each other in a screw gear relationship.

Here, as shown in FIG. 3, the center of the driving gear 36 is set so as to be situated at an intersection point Q where a perpendicular line (that is, the imaginary normal line O–O') extending downward towards the rotary shaft 30 (that is, the second rotary shaft) from the center O of the rotary member 13 (that is, from the center axis of the steering wheel or first rotary shaft) and the rotational center axis of the rotary shaft 30 intersect each other. The auxiliary gear (that is, the third gear) 40 is set at a location situated away from the intersection point Q in the illustrated X1 direction.

The outer peripheral surface of the auxiliary gear 40 comprises the helical gear 40A having an inverted spherical shape, so that, as shown in FIG. 1 and FIG. 3, the curved sectional shape lies along the pitch circle of the rotary member 13. Therefore, even at a location situated away from the intersection point Q in the illustrated X1 direction, it is possible to engage the inverted spherical, helical gear 40A of the auxiliary gear 40 and the helical gear 13A of the rotary member 13. It is preferable that the crests of the teeth of the inverted spherical, helical gear 40A and the helical gears 13A and 36A have involute curved surfaces.

A description will now be given of the operation which prevents backlash from occurring between the driving gear 36A and the helical gear 13A.

Since the driving gear 36 is firmly fitted to the rotary shaft 30, it cannot move in the axial direction. The auxiliary gear 40 is inserted onto the rotary shaft 30 through the driving gear 36 so as to be relatively rotatably held through the rotary shaft 30. The axial movement of the auxiliary gear 40 is restricted by the washer 50, the first magnet M1, and the speed nut 56. The biasing member 50A provided between the driving gear 36 and the auxiliary gear 40 applies biasing force to the driving gear 36 in the β2 direction, and biasing force to the auxiliary gear 40 in the β1 direction. Therefore, as shown in FIG. 4, a tooth surface 40A1 of the helical gear 40A of the auxiliary gear 40 contacts a tooth surface 13A1 of the helical gear 13A of the rotary member 13 from the β1 direction. During this time, the auxiliary gear 40 is positioned as a result of being resiliently pressed by the biasing member 50A in the axial direction (that is, the X2 direction). Therefore, even if the helical gears, that is, tapered surfaces contact each other, sliding between both tooth surfaces does not occur, so that both of the helical gears are stably in close contact with each other.

Here, with reference to the portion where the helical gear 13A and the helical gear 40A contact each other, a biasing force (that is, a rotational force) is exerted onto the driving gear 36 in the β2 direction. Since, as mentioned above, the auxiliary gear 40 and the rotary shaft 30 rotate relative to each other, the driving gear 36 provided at the rotary shaft 30 is rotated until a tooth surface 36A1 of the helical gear 36A comes into contact with a tooth surface 13A2 of the helical gear 13A of the rotary gear 13. Even here, the driving gear 36 is similarly positioned in the axial direction (that is, the X2 direction), so that axial sliding between the teeth of the helical gears does not occur, whereby they stably resiliently press against each other.

More specifically, the biasing member 50A exerts rotational forces acting in opposite directions onto the driving gear 36 and the auxiliary gear 40. Here, the tooth surface 36A1 of the helical gear 36A of the driving member 36 and the tooth surface 40A1 of the helical gear 40A of the auxiliary gear 40 resiliently sandwich both tooth surfaces 13A1 and 13A2 of the helical gear 13A of the rotary member 13 from both directions (that is, the β1 and β2 directions). Therefore, no gaps are created between the helical gear 13A of the rotary member 13 and the helical gear 36A of the driving gear 36, and between the helical gear 13A of the rotary member 13 and the helical gear 40A of the auxiliary gear 40, so that they can always be kept in contact with each other.

Consequently, rattling resulting from backlash between the rotary member 13 and the driving gear 36 can be reduced, so that the rotational force exerted onto the rotary member 13 from the steering wheel Sh can be efficiently transmitted to the driving gear 36.

In addition, the screw shaft 30a engages the fitting portions 23a and 23b of the fitting member 23. Here, the fitting portions 23a and 23b are resiliently pressed against the screw shaft 30a in the Z1 direction by the biasing force of the plate spring 22, so that backlash between the screw shaft 30a and the inside surfaces 23c and 23c of the corresponding fitting portions 23a and 23b can be reduced.

When the angle sensor 10 is mounted to the steering wheel Sh of an automobile, and the steering wheel Sh is rotated, the rotary member 13 rotates in correspondence with this rotation. For example, when the rotary member 13 is rotated once in the illustrated clockwise direction (that is, in the α1 direction), a rotational force in the illustrated β2 direction acts on the auxiliary gear 40 and the driving gear 36 engaging the rotary member 13, so that the rotary shaft 30 and the first magnet M1 are set so as to rotate eight times in the illustrated β2 direction.

The outer peripheral surface of the first magnet M1 is magnetized so that the N pole and the S pole pass by the Hall elements H1 once or twice each time the first magnet M1 rotates once. Accordingly, the pair of Hall elements H1 provided at the V-shaped first base 17d opposing the first magnet M1 detect changes in the strength of the magnetic field of the magnet M1, making it possible to detect the rotational direction and very small rotational angles of the rotary member 13.

When the rotary shaft 30 is rotated in either the β1 direction or the β2 direction, the screw shaft 30a of the rotary shaft 30 causes an advancing force in either the illustrated X1 direction or X2 direction (that is, in either one of the thrust directions) to act on the fitting portions 23a and 23b used for the holder 21. This causes the sliders 21a of the holder 21 to slide on the rails 17e1 and 17e2 of the second base 17e and to move linearly in either the illustrated X1 direction or X2 direction. In other words, the screw shaft 30a of the rotary shaft 30 and the fitting portions 23a and 23b of the fitting member 23 are converting portions for converting the rotational movement of the rotary shaft 30 in either the β1 or the β2 direction into linear movement. The converting portions cause the detection member 20 to move in either the X1 or X2 direction in order to output a signal which varies linearly within the entire rotational angle range of the steering wheel Sh.

Here, as described above, the plate spring 22 biases the fitting member 23 horizontally in order to prevent rattling between the screw shaft 30a of the rotary shaft 30 and the inside surfaces 23c and 23c of the corresponding fitting portions 23a and 23b, so that the detection member 20 which moves in accordance with the rotation of the screw shaft 30a advances with higher precision. In other words, the linearity between the angle of rotation of the rotary member 13 and the distance of movement of the detection member 20 can be enhanced. Therefore, when the second magnet M2 provided at the detection member 20 moves while opposing the Hall element H2 in order to detect through the Hall element H2 any changes in the Z-direction component of the magnetic field generated by the second magnet M2 at this time, the rough angle of rotation of the rotary member 13 can be detected with high precision. In other words, the Hall element H2 can generate an output which precisely corresponds to (or is proportional to) the angle of rotation of the rotary member 13.

Even if the forms of the internal threads of the inside surfaces 23c and 23c of the corresponding fitting portions 23a and 23b are worn away, the fitting member 23 is always biased towards the screw shaft 30a through the plate spring 22, so that rattling can be prevented from occurring for a long period of time, as a result of which the precision with which the detection member 20 is advanced can be kept high.

The fitting portions 23a and 23b are formed into U shapes so that the top portions thereof are open, making it possible to easily assemble the screw shaft 30a and the fitting portions 23a and 23b.

Figure 7:
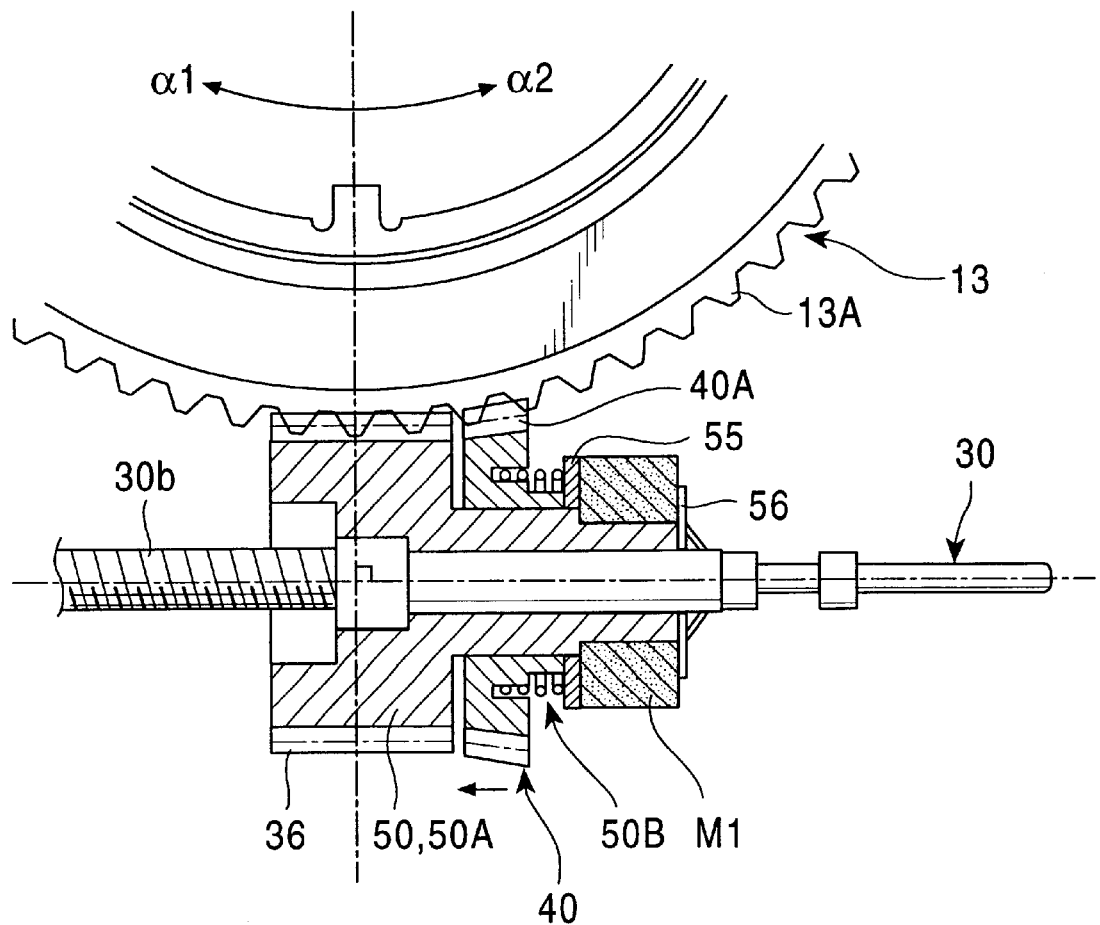
FIG. 7 is a sectional view of another embodiment of an angle sensor.
Figure 8:
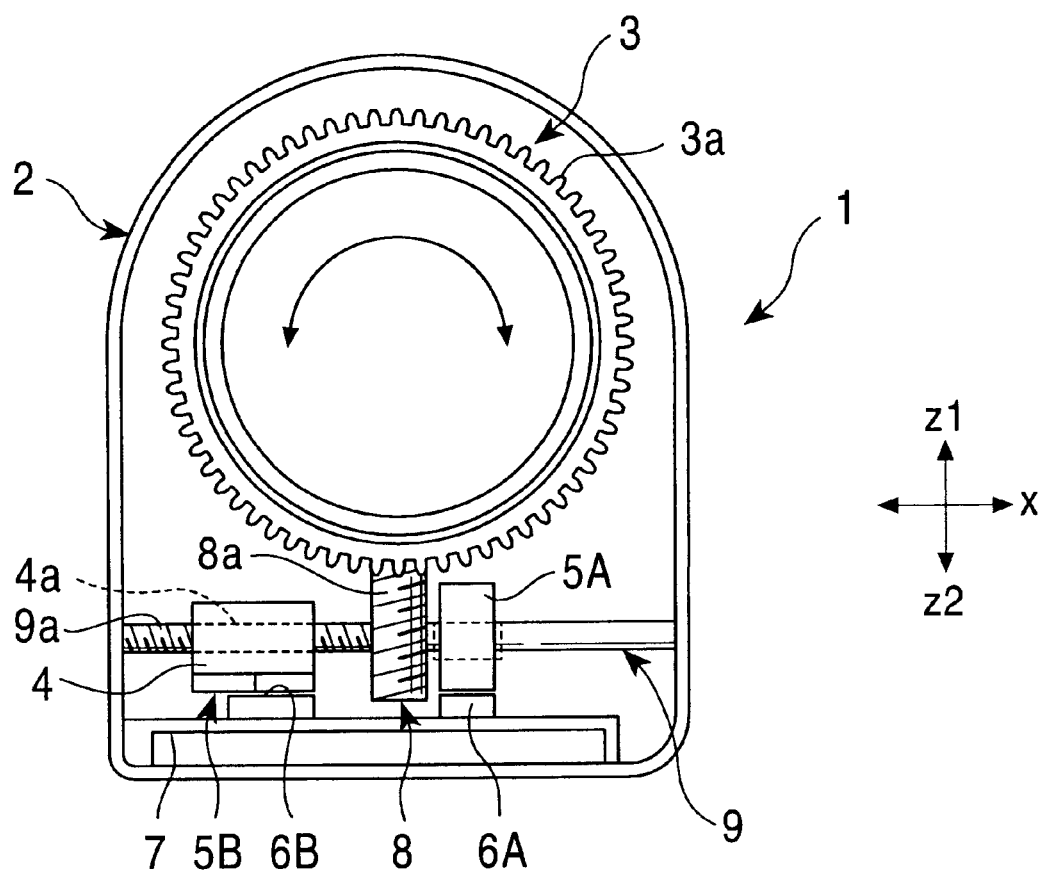
FIG. 8 is a plan view of the internal structure of a conventional angle sensor.

FIG. 7 is a sectional view of the main portion of another embodiment of an angle sensor.

In the angle sensor shown in FIG. 7, a biasing member 50B is provided between an auxiliary gear 40 and a washer 55 instead of providing the biasing member 50A between the driving gear 36 and the auxiliary gear 40 as in the first embodiment. A rotary member 13 and a driving gear 36 include a helical gear 13A and a helical gear 36A, respectively, and an auxiliary gear 40 comprises a screw-cap-shaped gear 40A. The rotary member 13 and the driving gear 36, and the rotary member 13 and the auxiliary gear 40 engage each other in a screw gear relationship. The rotations of the auxiliary gear 40 in the β1 and β2 directions (see FIG. 2) are restricted, so that movements in only the X1 and X2 directions are possible.

The biasing member 50B is, for example, a coil spring or a plate spring, and biases the auxiliary gear 40 towards the driving gear 36 (that is, in the illustrated X2 direction). A tapered or inverted spherical, helical gear 40A is provided at the outer peripheral surface of the auxiliary gear 40 similarly to the above, so that, when it is biased towards the driving gear 36, the helical gear 40A of the auxiliary gear 40 can engage the helical gear 13A of the rotary member 13.

The helical gear 40A while rotating the rotary member 30 moves along a tapered surface of the helical gear 13A in the axial direction (that is, the X2 direction) so that gaps are not produced at the portion where the helical gear 40A of the auxiliary gear 40 and the helical gear 13A of the rotary member 13 contact each other and at the portion where the helical gear 13A and the helical gear 36A of the driving gear 36 contact each other. Therefore, one surface of the helical gear 13A of the rotary member 13 and one surface of the helical gear 36A of the driving gear 36 are always kept in contact with each other, making it possible to prevent rattling caused by backlash therebetween.

As in the first embodiment, the rotational force of the rotary member 13 can be efficiently transmitted to the driving gear 36, so that the linearity of the holder 21 can be increased, making it possible to detect the angle of rotation of the steering wheel Sh with high precision.

Although in the above-described embodiment a gap is prevented from being formed at the portion where the helical gear 13A of the rotary member 13 and the helical gear 36A of the driving gear 36 contact each other by incorporating a biasing member 50A so that it is flexed in the inside diameter direction and axial direction, this may be achieved by incorporating the biasing member 50A so that it is flexed in either the axial direction or the inside diameter direction. In addition, the biasing member 50A may be incorporated so as to spread in the axial direction.

In the case where the biasing member 50A is only flexed in the axial direction, it is preferable that the biasing member 50A not be positioned in the direction of rotation with respect to at least one of the auxiliary gear 40 and the driving gear 36. In this case, a tooth surface of the driving gear 36 and a tooth surface of the auxiliary gear 40 slide along the tooth surfaces of the helical gear 13A, as a result of which the auxiliary gear 40 and the driving gear 36 rotate. Thus, it is possible to expect this embodiment to provide advantages similar to those provided by the first embodiment.

In the case where the biasing member 50A is only flexed in the inside diameter direction, it is preferable that the biasing member 50A not be positioned in the axial direction with respect to at least one of the auxiliary gear 40 and the driving gear 36. In this case, a tooth surface of the driving gear 36 and a tooth surface of the auxiliary gear 40 slide along the tooth surfaces of the helical gear 13A, as a result of which the auxiliary gear 40 moves axially so that its location is fixed. Thus, it is possible to expect this embodiment to provide advantages similar to those provided by the first embodiment.

In the case where the biasing member 50A is incorporated so as to spread in the axial direction, the axial location of the auxiliary gear 40 is restricted by the driving gear 36. In addition, a tooth surface 40A2 of the helical gear 40A and a tooth surface 13A2 of the helical gear 13A are always in contact with each other, and a tooth surface 36A2 of the helical gear 36A and a tooth surface 13A1 of the gear 13A are always in contact with each other.

In the above-described embodiment, the biasing member 50A is incorporated so as to be flexed in both the inside diameter direction and the axial direction, and the auxiliary gear 40 is rotatably held with respect to the rotary shaft 30. In addition, the axial movement of the auxiliary gear 40 is prescribed, and, with the location where the auxiliary gear 40 and the rotary member 13 contact each other serving as a reference, the driving gear 36 is biased towards the rotary member 13. However, the auxiliary gear 40 may be joined to the rotary shaft 30 through splines, and the axial movement of the auxiliary gear 40 may be such as not to be restricted. Here, it is preferable that the biasing member 50A not be positioned in the direction of rotation with respect to at least one of the auxiliary gear 40 and the driving gear 36.

In this case, the helical gear 40A while rotating the rotary shaft 30 moves axially along a tapered surface of the helical gear 13A so that no gaps are created at the portion where the helical gear 13A and the helical gear 40A of the auxiliary gear 40 contact each other and at the portion where the helical gear 13A and the helical gear 36A of the driving gear 36 contact each other. Therefore, a tooth surface of the helical gear 13A of the rotary member 13 and a tooth surface of the helical gear 36A of the driving gear 36 are always in contact with each other, so that rattling caused by backlash therebetween does not occur.

Although in the first embodiment the biasing member 50A is provided between the driving gear 36 and the auxiliary gear 40, a biasing member may be disposed between the auxiliary gear 40 and the washer 55 as a result of holding the washer 55 and the driving gear 36 so that they rotate integrally.

Although in the each of the above-described embodiments the degree with which the fitting portions 23a and 23b of the fitting member 23 and the thread grooves of the screw shaft 30a contact each other at the contact portions is increased by forming the fitting portions 23a and 23b as separate portions at both ends of the fitting member 23, the fitting portions 23a and 23b may be integrally formed from one end to the other end of the fitting member 23.

Although in each of the above-described embodiments the plate spring 22 and the holder 21, and the plate spring 22 and the fitting member 23 are joined together through cuts and protrusions at two locations, they may be joined together at at least two or more locations or by bonding the whole surfaces thereof.

Although as guiding members for guiding the detection member 20 two rails 17e1 and 17e2 are provided on the second base 17e, one rail or three or more rails may be used as long as the detection member 20 can be moved linearly in the direction of movement.

Although, in each of the embodiments, the cuts 22a and 22b are cross-shaped, they may be formed as holes or holes having cross-shaped cuts formed therearound in order to be fitted onto the corresponding protrusions 21g and 21h. Although the plate spring is held by inserting the cuts 22a and 22b onto the corresponding protrusions 21h and 21g, the plate spring 22 may be held by the holder 21 by insert molding. In other words, mounting structures other than that described above may be used as long as the plate spring 22 is positioned and held by the holder 21 without any rattling of the plate spring 22 with respect to the holder 21.

Although, in each of the embodiments, the cutaway portion 22C is square, it may have a shape which separates the portion between the cuts 22a and 22b or the portion between the holes 22c and 22d. In addition, although the mounting surfaces 22A and 22B of the plate spring 22 are flat surfaces, ribs may be formed thereon along the axial direction, or ends thereof may be bent at bending lines parallel to the axial line in order to increase the twisting strength without affecting the flexed portion of the plate spring 22.

According to the present invention described in detail above, backlash between the rotary member and the driving gear can be reduced by the auxiliary gear, making it possible to efficiently transmit the rotational force of the rotary member to the driving gear. Therefore, the linearity of the angle sensor can be increased, making it possible to detect the angle of rotation with high precision.

As can be understood from the foregoing description, according to the present invention, the degree with which the screw shaft and the fitting portions contact each other can be increased, making it possible to decrease rattling which tends to occur therebetween. Therefore, the detection member can be advanced in the axial direction thereof with higher precision, making it possible to detect the angle of rotation of the first rotary shaft with high precision.

What is claimed is:

1. An angle sensor comprising:

a first rotary shaft rotatably held;

a first gear having a through hole to which the first rotary shaft is fitted and teeth portions disposed at an outer circumferential surface thereof, said first gear rotating in correspondence with the first rotary shaft;

a second rotary shaft disposed perpendicular to the first rotary shaft and having an axis that is extended in a tangential direction to the first gear;

a second gear which is integrally held at and rotates along with the second rotary shaft, said second gear having teeth portions that engage with the teeth portions of the first gear, the teeth portions of the first and second gear being engaged with each other at an intersection point of a normal line from the center of rotation of the first gear that crosses perpendicular to the second rotary shaft;

a third gear which is movably held at the second rotary shaft relative to the second rotary shaft and having teeth portions engaged with the teeth potions of the first gear, wherein the third gear is arranged side-by-side with the second gear, and an axial sectional shape of the third gear comprises a shape in which the teeth portions are along the outer circumference of the first gear;

a detected member held at the second rotary shaft; and a detecting portion for detecting rotation of the detecting member, a rotating angle of the first rotary shaft being detected by detection at the detecting portion;

wherein the first gear, the second gear and the third gear are engaged with each other in a screw gear relationship, and wherein a biasing member is provided to cause the teeth of the third gear to be abutted against the teeth of the first gear without any looseness, and to cause the teeth of the second gear to be abutted against the teeth of the first gear without any looseness, said biasing member being arranged between the second gear and the third gear.

2. An angle sensor according to claim 1, wherein the biasing member exerts a biasing force onto the second gear in a direction of rotation thereof.

3. An angle sensor according to claim 1, wherein the biasing member exerts a biasing force in a direction in which the second gear approaches the first gear.

4. An angle sensor for detecting an angle of rotation of a first rotary shaft as a result of a detecting operation by a detecting member, the angle sensor comprising a first gear which rotates in accordance with the first rotary shaft, a screw shaft which extends in a direction perpendicular to the first rotary shaft, a second gear which rotates with the screw shaft and which engages the first gear, a fitting member which engages the screw shaft and which moves in an axial direction of the screw shaft by a rotational force of the screw shaft, a detection member to be detected which moves along with the fitting member, a detection portion to be detected provided at the detection member, and a detecting member for detecting a linear movement of the detection portion, wherein the fitting member and the detection member are connected together by a plate spring, wherein the fitting member is supported by the plate spring, wherein a plate thickness direction of the plate spring is oriented in a direction perpendicular to a direction of movement of the fitting member and the detection member, and wherein the plate spring is secured to the fitting member and the detection member in the direction perpendicular to the direction of movement of the fitting member and the detection member and at a location where a gap is formed in a plate surface direction, the plate spring being secured along a line facing the direction of movement of the fitting member and the detection member.

5. An angle sensor according to claim 4, wherein a mounting surface of the plate spring for mounting to the fitting member and a mounting surface of the plate spring for mounting to the detection member are located in the same plane.

6. An angle sensor according to claim 4, wherein the fitting member comprises a U-shaped fitting portion which opens in a direction perpendicular to a plane of the plate spring, the fitting portion engaging the screw shaft.

7. An angle sensor according to claim 6, wherein the fitting member comprises a pair of t he fitting portions which are separated from each other in the direction of movement thereof, wherein the plate spring has a cutaway portion formed in the center portion thereof, and wherein the pair of fitting portions are biased towards the screw shaft by an area of the plate spring where the cutaway portion is not formed.

8. An angle sensor according to claim 4, further comprising a guiding member for guiding the movement of the detection member in an axial direction thereof, the guiding member having at least one rail which is provided parallel to the screw shaft, the detection member sliding on the at least one rail.

9. An angle sensor according to claim 8, wherein two of the rails parallel to each other are provided along the direction of movement, and wherein the fitting member is located substantially at the center of a region between the two rails.

* * * * *

UNITED STATES PATENT AND TRADEMARK OFFICE
CERTIFICATE OF CORRECTION

PATENT NO.    : 6,396,386 B2
DATED         : May 28, 2002
INVENTOR(S)   : Hirofumi Okumura It is certified that error appears in the above-identified patent and that said Letters Patent is hereby corrected as shown below:

<u>Column 16,</u>
Line 45, delete "t he" and substitute -- the -- in its place.

Signed and Sealed this

Twentieth Day of August, 2002

*Attest:*

JAMES E. ROGAN
*Attesting Officer*      *Director of the United States Patent and Trademark Office*